UNITED STATES PATENT OFFICE 2,497,168

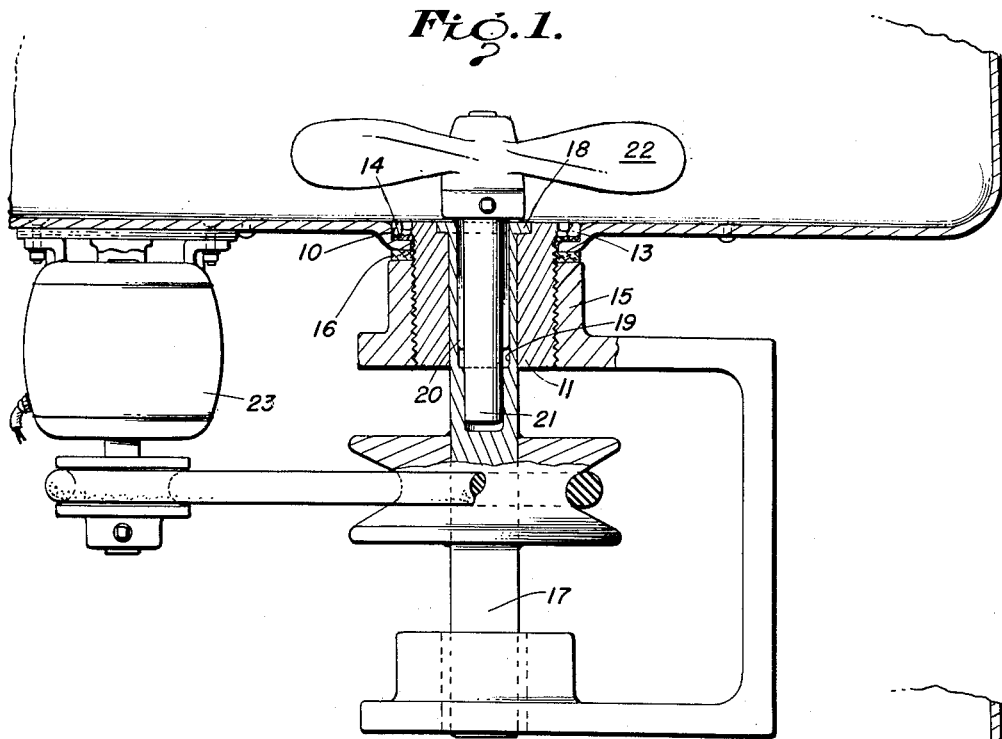
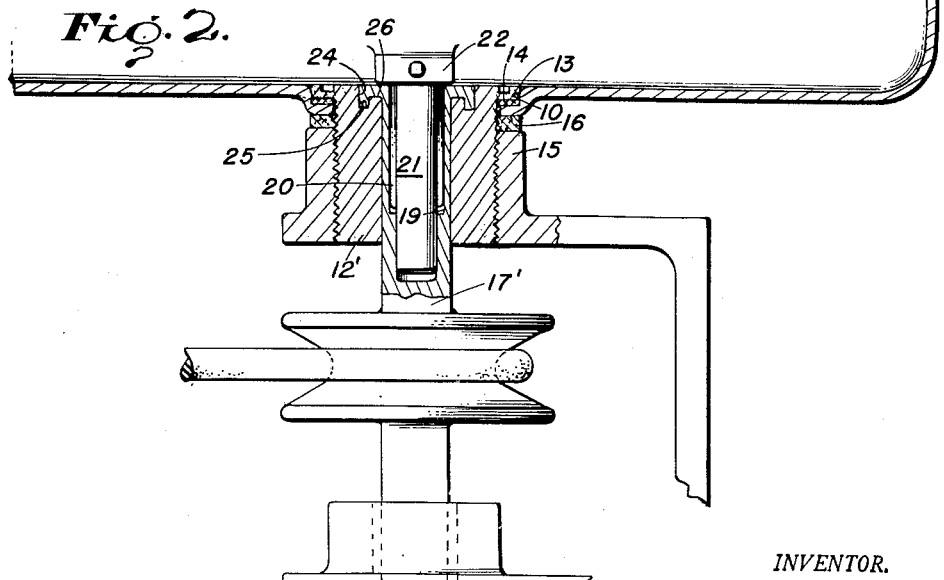

SINK DISHWASHER BEARING

William Norris Harris, Atlanta, Ga.

Application May 23, 1946, Serial No. 671,831

4 Claims. (Cl. 308—36.1)

The device relates to dishwashers and has as an object the provision of means to seal the joint about the agitator drive shaft where the same passes through the bottom of a sink.

It is an object of the invention to provide an exceedingly simple structure of the class referred to and one which has been found unexpectedly efficient in preventing the escape of water from the sink around the drive shaft.

Further objects will appear from the following description when read in connection with the accompanying drawings showing illustrative embodiments of the invention and wherein—

Figure 1 is a vertical section showing a motor and a pulley hanger with a shaft bearing shown in section; and Figure 2 is a similar view omitting the motor and showing a different form of bearing.

A porcelain sink is normally provided with a depression as shown at 10 for reception of a drain connection or the like. Experience has shown that a sink cannot be coated with the usual porcelain enamel if bearing blocks or shaft attachments are made rigid with the sink, before the enamel is applied.

It is necessary to enamel the sink first and subsequently attach a bearing assembly where a structure such as shown in the drawings herewith is necessary.

In accordance with the invention, the bearing 11, is secured to the sink by means of the flange 13 seating in the depression 10, a gasket 14 being supplied to keep the joint tight. The bearing 11 is shown as having screw threaded engagement with a hub of the shaft hanger 15 whereby to compress a gasket 16 and the gasket 14. The shaft 17 passing through the bearing 11 is shown in Figure 1 as formed with a flange lip 18 of plain outer surfaces engaging a complemental recess in the bearing 11. The shaft 17 is formed hollow and the recess has channels 19 to coact with feathers 20 formed on the shaft 21 which is adapted to drive an impeller 22 to throw water over dishes in the sink, the shaft 17 being shown as having belt drive from the motor 23.

Experiments have shown unexpectedly that a plain bearing such as shown at 18 when used with an impeller formed to exercise a downward pressure upon the propeller shaft will not leak or if leakage occurs the leakage will be so slight as to be not seriously objectionable.

In the form of invention shown in Figure 2, the bearing 12' is formed with a recess 24 which has an angular channel 25 and an upstanding lip 26 and the drive shaft 17' is formed at its upper end with a complemental flange as shown. It is found that this form of bearing will prevent any such slight leakage as is possible with the form shown in Figure 1, particularly when the device is not running. The impeller 22 and its shaft 21 may be freely removed from the shaft 17 or 17' when the sink is desired for use for other purposes than washing dishes.

Minor changes may be made in the physical embodiments of the invention, within the scope of the appended claims, without departing from the spirit of the invention.

I claim:

1. A non-leaking shaft bearing comprising, in combination: a bearing mounted liquid-tight in the wall of a liquid receptacle; a shaft journaled in said bearing, said bearing formed with an annular recess opening to its liquid contacting end; said shaft having an annular flange closely fitting said recess and means whereby said shaft is adapted to drive a dishwashing impeller.

2. The structure of claim 1 wherein said annular recess has an annular portion of excess depth adjacent its cylindrical wall and an inner lip portion projecting above said excess depth and wherein the flange upon said shaft has a depending lip complemental with such excess depth portion of the recess.

3. The structure of claim 1 wherein a shaft hanger is in threaded engagement with said bearing.

4. A non-leaking shaft bearing comprising, in combination: a bearing mounted liquid-tight in the wall of a receptacle, a shaft journaled in said bearing and carrying a flange; said bearing formed with an annular recess surrounding its bearing opening, said recess opening at a liquid contacting side of said wall; an annular flange carried by said flange closely fitting said recess; and means driven by said shaft, to be immersed in liquid when said means is operating.

WILLIAM NORRIS HARRIS.

REFERENCES CITED

The following references are of record in the file of this patent:

UNITED STATES PATENTS

| Number | Name | Date |
|---|---|---|
| 755,704 | Sanger | Mar. 29, 1904 |
| 2,403,520 | Gerner | July 9, 1946 |
| 2,422,741 | Morley | June 24, 1947 |